(12) United States Patent
Ding et al.

(10) Patent No.: US 12,732,894 B2
(45) Date of Patent: Sep. 8, 2026

(54) SYSTEM INFORMATION BLOCK (SIB) FOR AUGMENTED COMPUTING IN CELLULAR NETWORKS

(71) Applicant: Intel Corporation, Santa Clara, CA (US)

(72) Inventors: Zongrui Ding, Portland, OR (US); Qian Li, Portland, OR (US); Sangeetha L. Bangolae, Santa Clara, CA (US); Sudeep Palat, Gloucestershire (GB); Xiaopeng Tong, Beijing (CN); Alexandre Saso Stojanovski, Paris (FR); Ching-Yu Liao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 18/558,982

(22) PCT Filed: Aug. 10, 2022

(86) PCT No.: PCT/US2022/039926
§ 371 (c)(1),
(2) Date: Nov. 3, 2023

(87) PCT Pub. No.: WO2023/018777
PCT Pub. Date: Feb. 16, 2023

(65) Prior Publication Data

US 2024/0251331 A1 Jul. 25, 2024

Related U.S. Application Data

(60) Provisional application No. 63/232,403, filed on Aug. 12, 2021.

(51) Int. Cl.
*H04W 48/08* (2009.01)
*H04W 28/02* (2009.01)

(52) U.S. Cl.
CPC .......... *H04W 48/08* (2013.01); *H04W 28/02* (2013.01)

(58) Field of Classification Search
CPC ..... H04W 48/08; H04W 28/02; H04W 48/12; H04L 67/50; H04L 69/24
See application file for complete search history.

(56) References Cited

U.S. PATENT DOCUMENTS

2014/0029420 A1* 1/2014 Jeong .................... H04W 8/18 370/328
2020/0404069 A1* 12/2020 Li ......................... H04L 67/59

FOREIGN PATENT DOCUMENTS

WO 2018/205301 A1 11/2018
WO 2022/026081 A1 2/2022

OTHER PUBLICATIONS

International Patent Office—International Search Report and Written Opinion mailed Nov. 23, 2022, from International Patent Application No. PCT/US2022/039926, 11 pages.

(Continued)

*Primary Examiner* — Charles C Jiang
*Assistant Examiner* — Rachel Elizabeth Marks
(74) *Attorney, Agent, or Firm* — Gray Ice Higdon, PLLC

(57) ABSTRACT

Various embodiments herein may relate to system information blocks (SIBs) for augmented computing in cellular networks. In particular, some embodiments may be directed to system information associated with computing service support in cellular networks. Other embodiments may be disclosed or claimed.

20 Claims, 9 Drawing Sheets

(56) References Cited

OTHER PUBLICATIONS

Lenovo, et al., "Study on RAN Evolution for Distributed Intelligence in Rel-18," 3GPP TSG RAN Rel-18 workshop, RWS-210253, Agenda Item: 4.3, Jun. 28-Jul. 2, 2021, Electronic Meeting, 7 pages.
CMCC, "Email discussion summary for [RAN-R18-WS-crossFunc-Overall]," 3GPP TSG RAN Rel-18 workshop, RWS-210656, Version 0.0.1, Agenda Item: 4.3, Jun. 28-Jul. 2, 2021, Electronic Meeting, 71 pages.
3GPP, "Technical Specification Group Services and System Aspects; System architecture for the 5G System (5GS); Stage 2 (Release 17)," 3GPP TS 23.501 V17.1.1 (Jun. 2021), 5G, 526 pages.
3GPP, "Technical Specification Group Services and System Aspects; Study on Enhancements to the Service-Based Architecture (Release 16)," 3GPP TR 23.742 V16.0.0 (Dec. 2018), 5G, 131 pages.
3GPP, "Technical Specification Group Radio Access Network; NG-RAN; Architecture description (Release 16)," 3GPP TS 38.401 V16.6.0 (Jul. 2021), 5G, 79 pages.
3GPP, "Technical Specification Group Core Network and Terminals; 5G System; Unified Data Management Services; Stage 3 (Release 17)," 3GPP TS 29.503 V17.3.0 (Jun. 2021), 5G, 403 pages.
3GPP, "Technical Specification Group Services and System Aspects; Procedures for the 5G System (5GS); Stage 2 (Release 17)," 3GPP TS 23.502 V17.1.0 (Jun. 2021), 5G, 692 pages.
3GPP, "Technical Specification Group Core Network and Terminals; Non-Access-Stratum (NAS) protocol for 5G System (5GS); Stage 3; (Release 17)," 3GPP TS 24.501 V17.3.1 (Jun. 2021), 5G, 825 pages.
Caulfield, et al., "A Cloud-Scale Acceleration Architecture," Microsoft corporation, 2016 49th Annual IEEE/ACM International Symposium on Microarchitecture (MICRO), Oct. 15-19, 2016 Taipei, Taiwan, 13 pages.
3GPP, "Technical Specification Group Radio Access Network; NR; Radio Resource Control (RRC) protocol specification (Release 16)," 3GPP TS 38.331 V16.5.0 (Jun. 2021), 5G, 959 pages.
Extended European Search Report in EP Application No. 22856543.8, 15 pages, dated May 16, 2025.
Yamamoto et al: 'Study on Edge and Fog Computing in oneM2M systems', R-0052-V-0.5.0, Feb. 5, 2019, 44 pages.
Zao, 'Nomenclature for Distributing Computing, Communications and Networking among the Things-to-Cloud Continuum', 26 pages, IEEE draft WGDS; 856676231857, IEEE-SA IMEET Central, Piscataway, NJ, vol. 1934, Apr. 20, 2019.

* cited by examiner

UE 402
Uu
RAN 404
AN 408
AP 406
LTE RAN 410
eNB 412
CN 420
Application/ Content Server 438
DN 436
LTE CN 422
To RAN
S1-MME
S1-U
MME 424
SGSN 428
HSS 430
S3
S6a
S11
SGW 426
S5
PGW 432
Gx
PCRF 434
To DN
SGI
NG-RAN 44
gNB 416
Xn
ng-eNB 418
NG
400
5GC 440
AUSF 442
AMF 444
SMF 446
UPF 448
N12
N11
N4
N6 To DN
To UE
N1
N2
N3
N13
Nausf
Namf
N8
N15
N22
Nsmf
N7
N10
NSSF – 450
NEF – 452
NRF – 454
PCF – 456
UDM – 458
AF – 460
Nnssf
Nnef
Nnrf
Npcf
Nudm
Nnaf
N5

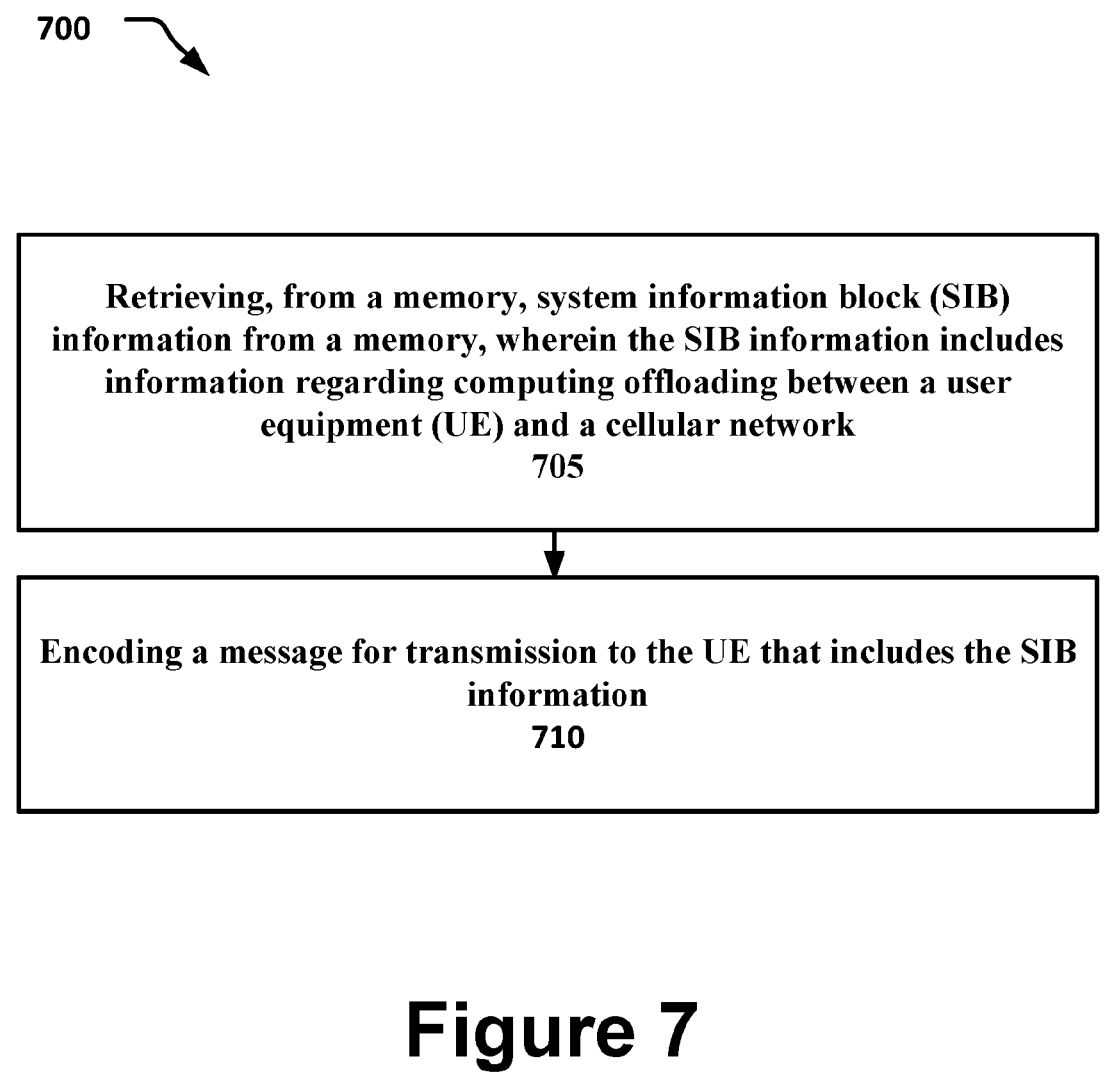

700

Retrieving, from a memory, system information block (SIB) information from a memory, wherein the SIB information includes information regarding computing offloading between a user equipment (UE) and a cellular network
705

Encoding a message for transmission to the UE that includes the SIB information
710

Figure 7

Determining, by a next-generation NodeB (gNB), system information block (SIB)information that includes information regarding computing offloading between a user equipment (UE) and a cellular network
805

Encoding, by the gNB, a message for transmission to the UE that includes the SIB information
810

SYSTEM INFORMATION BLOCK (SIB) FOR AUGMENTED COMPUTING IN CELLULAR NETWORKS

CROSS REFERENCE TO RELATED APPLICATION

The present application is a national phase entry under 35 U.S.C. § 371 of International Application No. PCT/US2022/039926, filed Aug. 10, 2022, entitled "SYSTEM INFORMATION BLOCK (SIB) FOR AUGMENTED COMPUTING IN CELLULAR NETWORKS," which claims priority to U.S. Provisional Patent Application No. 63/232,403, which was filed Aug. 12, 2021, the entire disclosures of which are hereby incorporated by reference.

FIELD

Various embodiments generally may relate to the field of wireless communications. For example, some embodiments may relate to system information blocks (SIBs) for augmented computing in cellular networks. In particular, some embodiments may be directed to system information associated with computing service support in cellular networks.

BACKGROUND

The next generation cellular network is expected to provide computing services and allows dynamic computing offloading from the device (UE) to the network based on resource availability with the telco network's cloudification process. In some embodiments, different computing scaling mechanisms between a UE and the cellular network may operate. For example, one solution may include computing as a service and another solution may include computing as a resource. For both mechanisms, the UE has to obtain some computing related capabilities, configurations and parameters before its interaction with the network for computing offloading. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 7, 8, and 9 depict examples of procedures for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
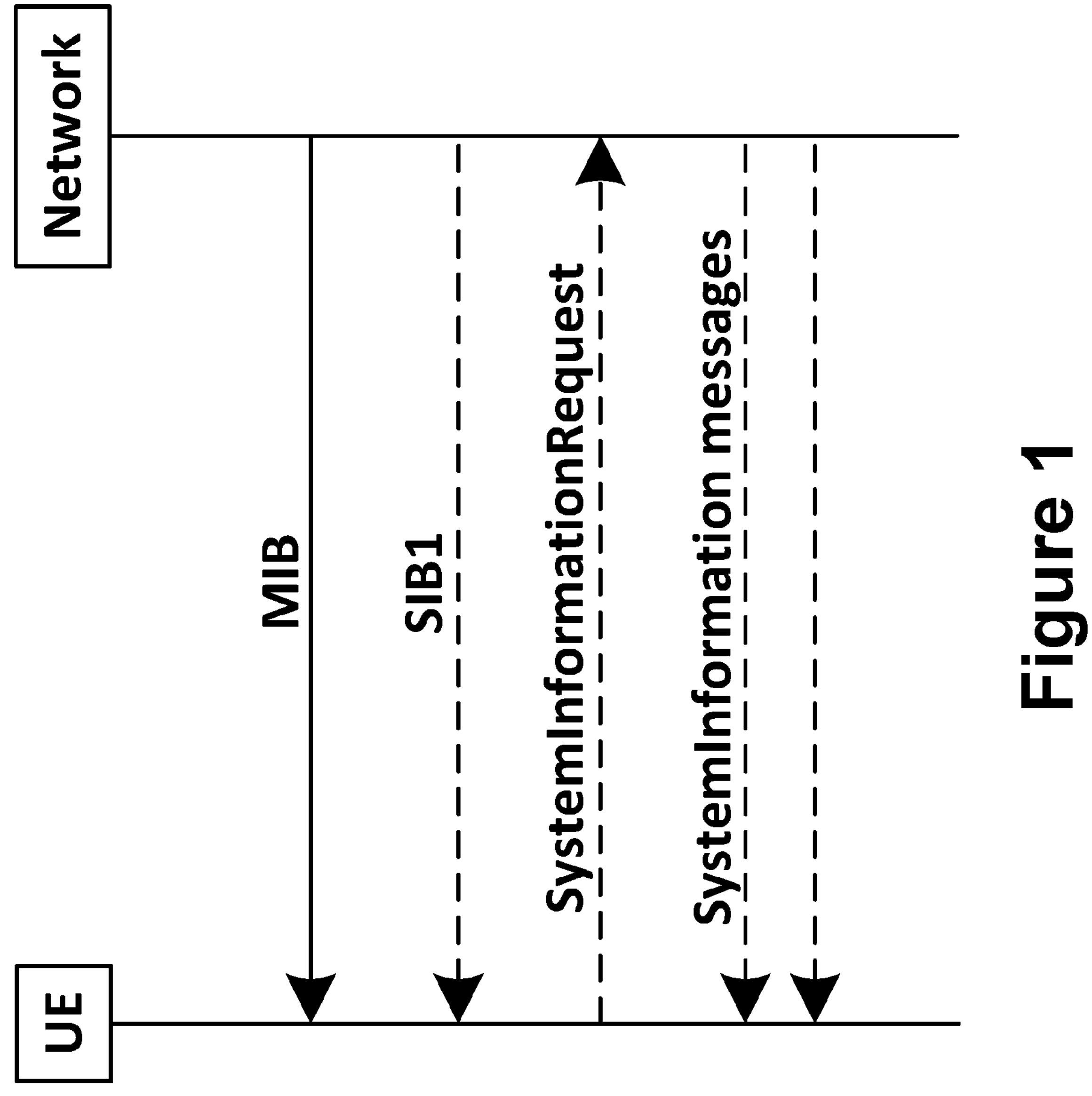
FIG. 1 illustrates an example of system information acquisition in TS 38.331, in accordance with various embodiments.

In some embodiments, SIBs other than SIB1 may be defined, which can be on-demand and requested from the UE for additional services, capabilities and configurations that the cellular network may support. A UE can request an on-demand SIB based on the procedure defined in FIG. 5.2.2.1-1 in TS 38.331 "NR; Radio Resource Control (RRC); Protocol specification," v. 16.5.0, 2021 Jul. 6, as shown in FIG. 1.

To enable the support of the computing service in the cellular network, there needs a mechanism to coordinate required information between the cellular network and the UE. In this disclosure, solutions to at least the following questions are proposed:

- What is the mechanism to indicate the required computing service support to the UE?
- What is the information related to computing offloading needed to be delivered to UE based on different solutions?
- If using system information based mechanism, how to provide the update of the system information for computing offloading to the UE?
- How to deliver the computing offloading related information or data to UE other than computing DRB?

Among other things, this disclosure proposes to use System Information for indicating the support of the computing service in the cellular network. The system information block (SIB) related to computing offloading is proposed as a new SIB type or a service SIB similar to positioning SIB. The computing related information is identified to serve as SIB IEs which can be delivered to UE based on three modes: unicast, multicast and broadcast with ciphering keys separately sent to UE.

Computing offloading is a feature with the cloudification of the Telco networks, which requires platforms and computing units to be deployed in the cellular network, and embodiments of the present disclosure help enhance this feature. The proposed changes to the ASN.1 description in TS 38.331 are shown below, namely with reference to sibType15.

On-Demand SIB for Computing Offloading

Option1: SIB for Computing Offloading is Defined as a New SIB Type for SIB-TypeInfo A new type of SIB, e.g., sibType15, for computing offloading can be defined to be included in the SIB-TypeInfo.

```
SIB-TypeInfo ::=  SEQUENCE {
  type            ENUMERATED  {sibType2, sibType3, sibType4, sibType5, sibType6,
                              sibType7, sibType8, sibType9, sibType10-v1610,
                              sibType11-v1610, sibType12-v1610, sibType13-v1610,
                              sibType14-v1610, sibType15, spare3, spare2, spare1,... },
```

The si-BroadcastStatus of this SIB can be set as non-broadcasting and requested by UE or broadcasting. If si-BroadcastStatus is set as non-broadcasting, the UE can follow similar procedure as indicated in FIG. 1 to request the on-demand sib list. For both broadcasting or non-broadcasting, the SI for computing is generally static and not UE related.

In this option, the SIB for computing offloading can include at least one of the following information but not limited to:

- General information about Computing services in cellular network such as
  - Whether computing offloading between UE and the cellular network is supported
  - Which computing offloading mechanisms supported:
    1. computing as a platform micro-service
    2. computing as infrastructure resource
    - Both 1 and 2
  - Application/Vendor information supported to extend cellular network computing capability exposure for external party
    - Specific application such as AI/deep learning, content streaming services, etc.
    - Cloud platform vendors such as AWS, Azure that supported
  - The maximum computing resource that can be requested per UE may include:
    - The resource type, size, programming language
      - The type of the xPUs, accelerators
      - The type of the memory and access protocol supported
      - The supported computing task types such as a job or deployment. In some embodiments, a "job" may refer to: task will be deleted automatically after it complete successfully, and "deployment" means a task will continue to run unless it is requested to delete by task requester. Some embodiments may differentiate "Computing task notifications such as computing task status" for the two types.
      - It should be noted that besides computing resources, embodiments of the present disclosure may include an information field on computing services, such as AI learning services with a list of supported models, video processing service, data analytics service, etc.
  - The computing services that can be provided to UE as micro service such as
    - AI/ML services with a list of supported models. In some embodiments, training and inference may be different computing types from the AI perspective.
    - Video/Image processing service such as transcoding, rendering . . . etc
    - Data analytics service
  - The capabilities and parameters related to the interconnect schemes to the computing resource or service including but not limited to:
    - RDMA related parameters including
      - targeted RDMA memory size, performance metrics,
      - software version,
      - congestion control and rate adaptation related parameters such as default QP data rates
      - It should be noted that embodiments of the present disclosure may operate in conjunction with a variety of different interconnect schemes in addition to RDMA.
    - PCIe over the air interface
- General information about UE's capability requirements such as
  - The minimum requirements for UE to request computing offloading
    - The requirements on UE's Comp CSF, OS, CPU
      - The software version, type, release, programming language and capabilities
- The barring list of UEs for computing offloading
- The expected performance metrics for computing offloading
- The radio configurations for computing session
  - Special configurations on frequency, carrier for computing session, similar to sidelink SIB (SIB 12) defined in TS 38.331.
- The information to access Comp CF such as
  - Comp CF IP addresses
  - Comp CF load information
  - Comp CF names, URL or capabilities for registration and resource discovery
- The information about dynamic resource utilization of the computing services In this option, the SIB for computing offloading can provide common information to all UEs.

The above information can be indicated in the new SIB partially or fully. If not all, the information can be provided by the cellular network to the UE when the UE requests for the computing services with computing services requirements. Upon receiving the on-demand SIB for computing offloading, the UE shall forward the computing related information to higher layers such as the Comp CSF and configure the radio accordingly for computing sessions.

Option2: SIB for Computing Offloading is Defined as a New Service SIB

In this option, the RRCSystemInfoRequest includes a new IE, e.g., rrcCompSystemInfoRequest, to indicate requesting the SIB for computing offloading as shown below:

```
RRCSystemInfoRequest ::=                SEQUENCE {
  criticalExtensions                      CHOICE {
    rrcSystemInfoRequest                    RRCSystemInfoRequest-IEs,
    criticalExtensionsFuture-r16            CHOICE {
      rrcPosSystemInfoRequest-r16             RRC-PosSystemInfoRequest-r16-IEs,
      rrcCompSystemInfoRequest                RRC-CompSystemInfoRequest-IEs,
      criticalExtensionsFuture                SEQUENCE { }
    }
  }
}
```

The computing service is introduced as a new service, which is similar to the support of the positioning service. Then the definition of SystemInformation can be enhanced to include such info as "compSystemInformation-rxx" as illustrated below:

```
SystemInformation ::=                     SEQUENCE {
  criticalExtensions                        CHOICE {
    systemInformation                         SystemInformation-IEs,
    criticalExtensionsFuture-r16              CHOICE {
      posSystemInformation-r16                  PosSystemInformation-r16-IEs,
      compSystemInformation                     CompSystemInformation-rxx-IEs,
      criticalExtensionsFuture                  SEQUENCE { }
    }
  }
}
```

The CompSystemInformation-IEs can include a sequence of UE specific and non-UE specific Computing related information elements. The non-UE specific information can be a subset of what defined above. This also allows UE specific information to be delivered to UE or UE groups based on encryption to realize unicast or multicast of computing related data. A piece of the UE specific information can include AssistanceCompDataSIBelement as an example as shown in the ASN.1 description below, which includes the expiration time, segmentation and ciphering keys for the assistance Comp data.

```
AssistanceCompDataSIBelement-rxx ::= SEQUENCE {
  valueTag-r15                          INTEGER (0..63)
  OPTIONAL,
  expiration Time-r15                   UTCTime
  OPTIONAL,
  cipheringKeyData-r15                  CipheringKeyCompData-rxx
  OPTIONAL,
  segmentationInfo-r15                  SegmentationInfo-r15
  OPTIONAL,
  assistanceCompDataElement-rxx           OCTET STRING,
  ...
}
CipheringKeyCompData-rxx ::= SEQUENCE {
  cipherSetID-r15                       INTEGER (0..65535),
  d0-r15                                BIT STRING (SIZE (1..128)),
  ...
}
SegmentationInfo-r15 ::= SEQUENCE {
  segmentationOption-r15                  ENUMERATED {pseudo-seg, octet-string-seg},
  assistanceDataSegmentType-r15           ENUMERATED {notLastSegment, lastSegment},
  assistanceDataSegmentNumber-r15         INTEGER (0..63),
```

Note that when to use unicast or multicast for providing computing related information is based on the cellular network and UE's subscription and status.

The assistanceCompDataElement includes at least one of but not limited to the following. It should be noted that, in some embodiments, assistanceCompData is delivered based on UE and the network's scheme to deliver the data as broadcast, multi-cast or unicast. Specially, assistanceCompData may be used to deliver more UE specific info.

Computing data specific to a UE or a group of UEs

Type1: Computing results

Type2: Computing task notifications such as computing task status for job type computing task
- Task rejected with cause and additional information
- Task in queue with case and additional information
- Task accepted with additional information such as expected completion time . . . etc
- Task completed with additional information such as actual completion time
- Task relocated with cause and additional information
- (if deployment type, status should be like: task reject, task in queue, task deployed, task deleted)

Type3: UE specific computing handling rules and policies
- Whether UE is barred
- Whether UE's subscription data for computing is changed
- Whether the maximum resource for a UE is reached Whether the computing offloading rules and policies are changed Type4: Computing offloading related QoS Whether the requested QoS is fulfilled Whether the requested QoS is changed Type5: computing resource status and related information New computing resources such as xPUs, accelerators are available How to request the available computing resource Type6: computing service status and related information AI/ML training process: training in progress, model obtained, etc.

Data processing service: data collected, processed, sent, etc.

Data analytics service: data collected, analytics generated, etc.

the status of the computing offloading transport

Any changes to the computing offloading transport

Type7: data about interconnect schemes such as

RDMA/RoCN related data such as information for congestion control

Alternatively, the CompSystemInformation IEs can be included in for example RRCReconfiguration or compRRCReconfiguration message to be delivered to a specific UE before any computing transport setup or separate from the computing transport setup such as in a data bearer setup for communication.

5) AMF accepts the attach or TAU request, check the information in the attach or TAU, and decide to deliver the ciphering key to the UE with the attach and TAU accept message
6) The attach or TAU accept message is sent to UE with the compute data ciphering keys as new IEs.
7) The ciphering keys will be deleted based on the rules from the Comp CF such as a timer.

Figure 3:
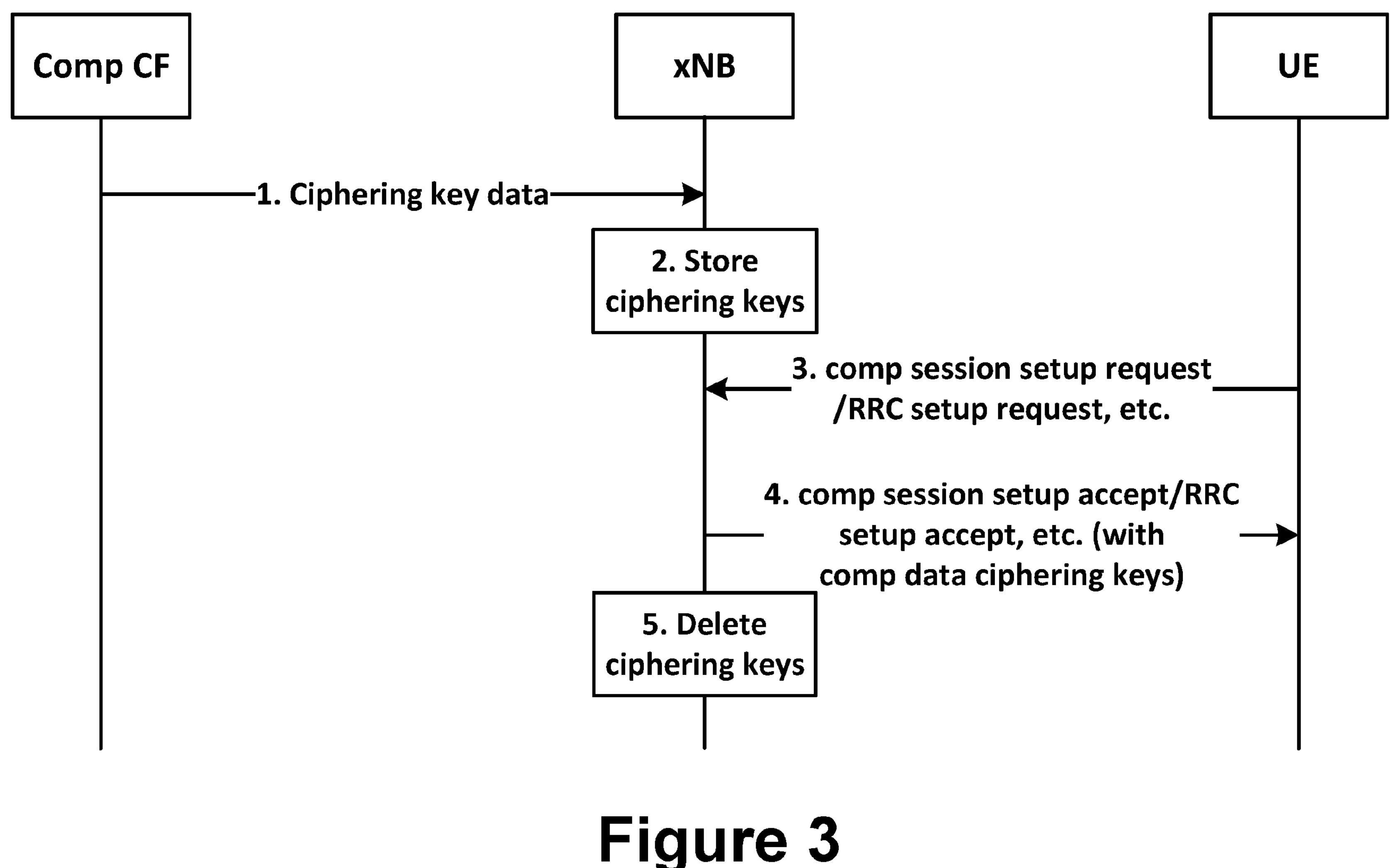
FIG. 3 illustrates an example of a key delivery procedure for decrypting assistanceCompData through RRC from a Comp CF to a UE in accordance with various embodiments.

The ciphering keys can also be sent from Comp CF directly to UE which can be delivered in a separate RRC messages as shown in FIG. 3.

1) Comp CF generate ciphering key and sends to AMF, which can be UE specific or a group of UE specific. This message can include the ciphering key, UE IDs, DNN, S-NSSAI, application ID, etc. This message also includes the rules for the xNB to keep the ciphering key data such as a timer
2) The xNB stores the keys
3) The UE sends RRC messages to the xNB. The RRC messages can be separate from the assistanceCompData is about. It can be a comp session setup request or RRC setup request, etc.
4) The xNB checks that the Comp ciphering keys need to be delivered to UE based on the UE ID or group ID. Then xNB sends the ciphering key as a new IE in the RRC messages to the UE
5) The xNB deletes the keys based on the rules set up by Comp CF.

Systems and Implementations

```
RRCReconfiguration-v1610-IEs ::=          SEQUENCE {
  otherConfig-v1610                         OtherConfig-v1610                                           OPTIONAL, -- Need M
  bap-Config-r16                            SetupRelease { BAP-Config-r16 }                             OPTIONAL, -- Need M
  iab-IP-AddressConfigurationList-r16       IAB-IP-AddressCoonfigurationList-r16                        OPTIONAL, -- Need M
  conditionalReconfiguration-r16            ConditionalReconfiguration-r16                              OPTIONAL, -- Need M
  daps-SourceRelease-r16                    ENUMERATED {true}                                           OPTIONAL, -- Need N
  t316-r16                                  SetupRelease {T316-r16}                                     OPTIONAL, -- Need M
  needForGapsConfigNR-r16                   SetupRelease {NeedForFapsConfigNR-r16}                      OPTIONAL, -- Need M
  onDemandSIB-Request-r16                   SetupRelease { OnDemandSIB-Request-r16}                     OPTIONAL, -- Need M
  dedicatedPosSysInfoDelivery-r16           OCTET STRING {CONTAINING PosSystemInformation-r16-IEs}      OPTIONAL, -- Need N
  dedidcatedCompSystemInfoDelivery-rxx      OCTET STRING {CONTAINING CompSystemInformation-rxx-IEs}     OPTIONAL, -- Need N
  sl-ConfigDedicatedNR-r16                  SetupRelease {SL-ConfigDedicatedNR-r16}                     OPTIONAL, -- Need M
  sl-ConfigDedicatedEUTRA-Info-r16          SetupRelease {SL-ConfigDedicatedEUTRA-Info-r16}             OPTIONAL, -- Need M
  targetCellSMTC-SCG-r16                    SSB-MTC                                                     OPTIONAL, -- Need S
  nonCriticalExtension                      SEQUENCE { }                                                OPTIONAL
}
```

Ciphering of the assistanceCompData and Key Delivery

To enable unicast or multi-cast of the assistanceCompData, as indicated above, ciphering keys can be delivered to a UE or a group of UEs to limit the access of computing data. The keys can be generated by Comp CF or the AMF and then delivered to the xNB. The ciphering keys defined in AssistanceCompDataSIBelement IE needs to work with the keys delivered separately to a UE or a group of UE to de-crypt the assistanceCompData.

Figure 2:
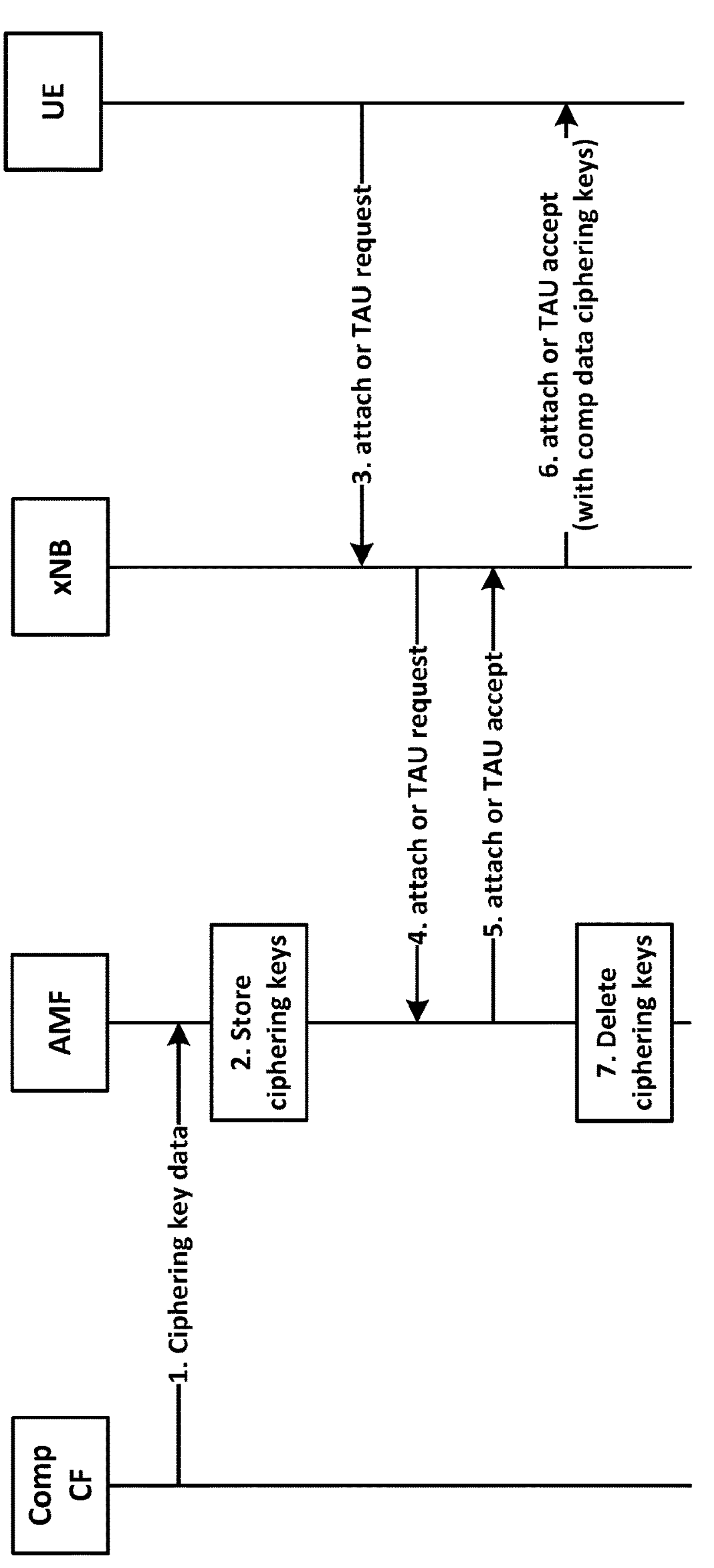
FIG. 2 illustrates an example of a key delivery procedure for decrypting assistanceCompData through NAS from a Comp CF to a UE in accordance with various embodiments.

If the ciphering key is delivered by AMF through NAS signaling, the procedure follows FIG. 2.

Figure 5:
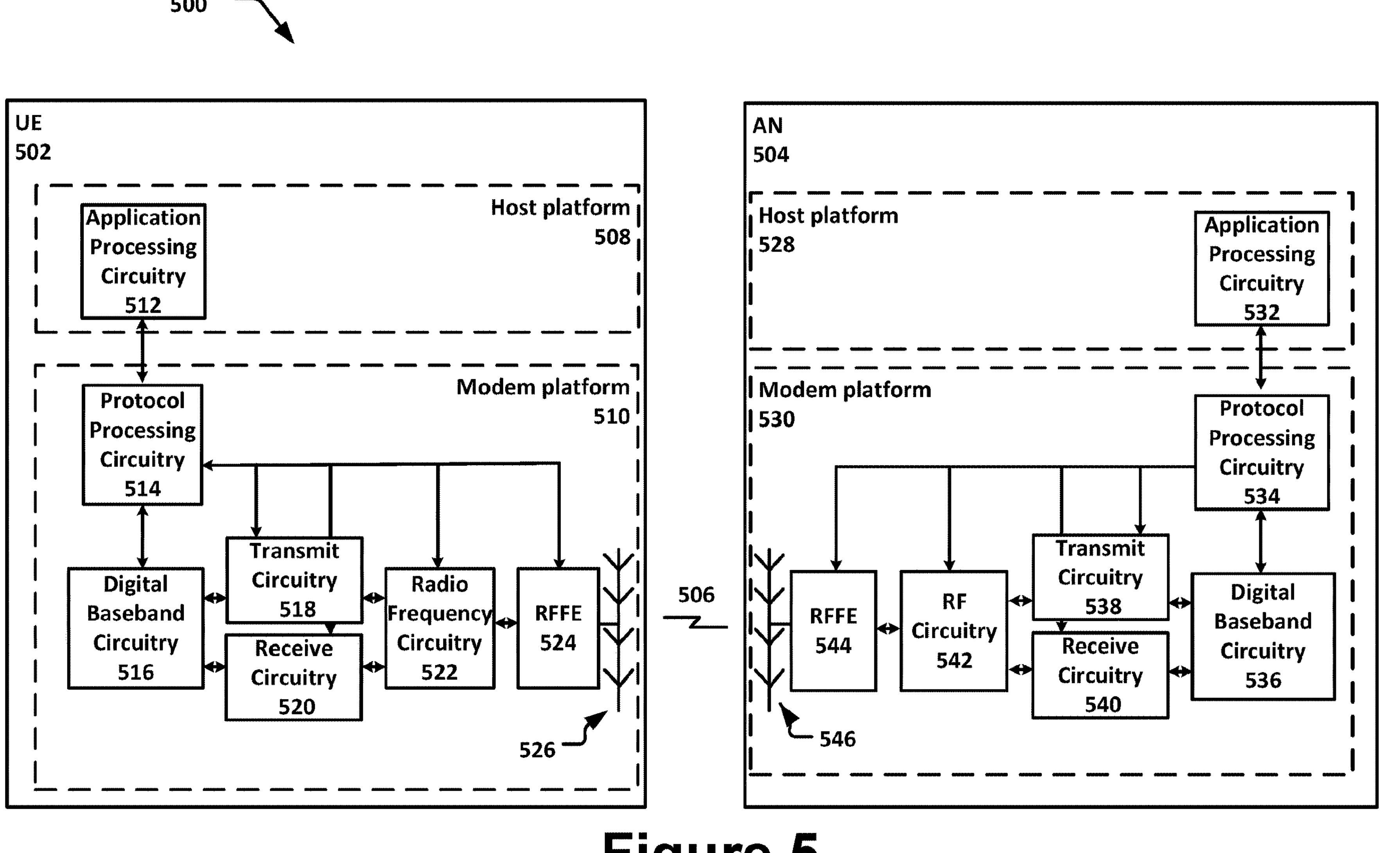
FIG. 5 schematically illustrates components of a wireless network in accordance with various embodiments.
Figure 6:
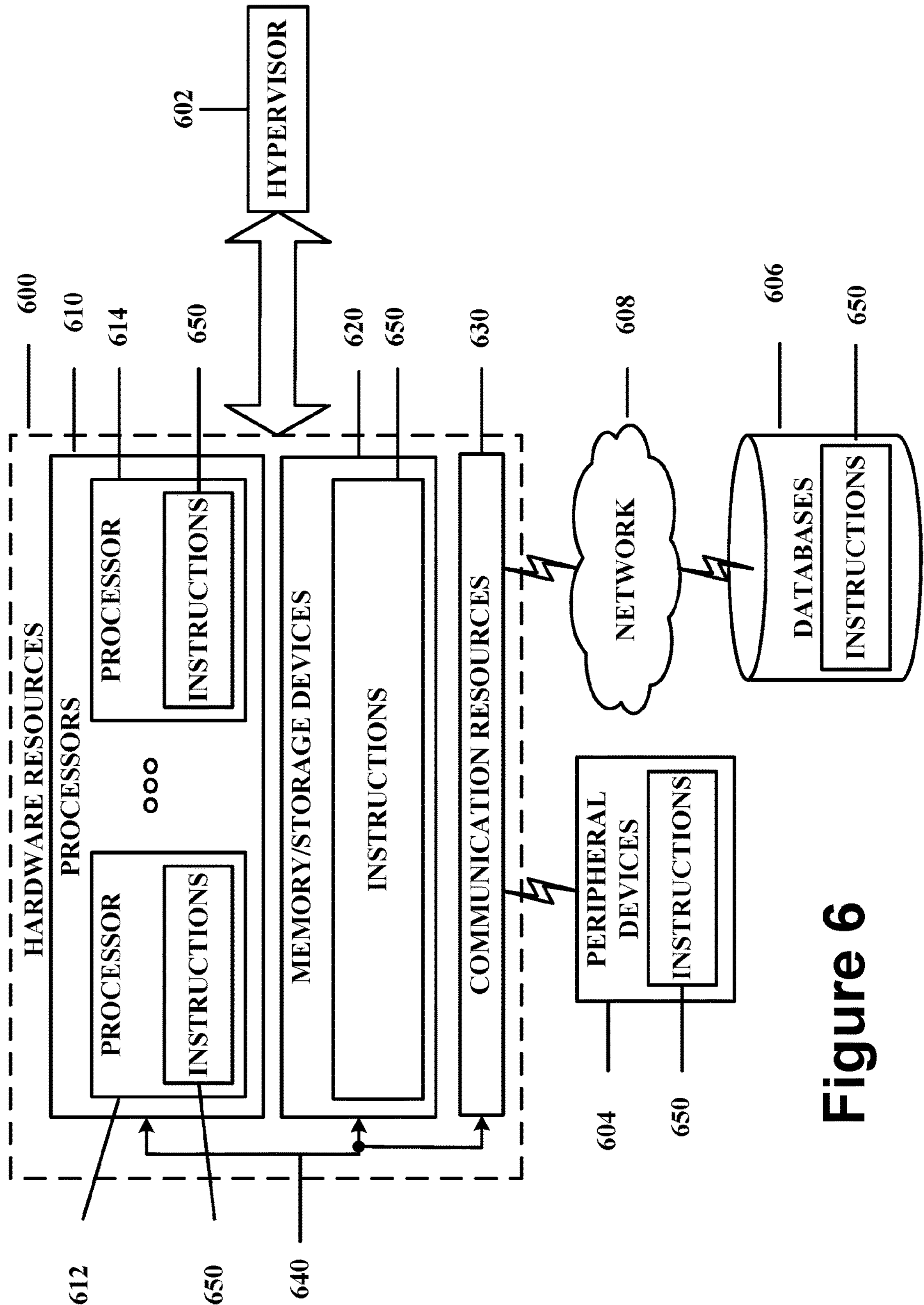
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

1) Comp CF generate ciphering key and sends to AMF, which can be UE specific or a group of UE specific. This message can include the ciphering key, UE IDs, DNN, S-NSSAI, application ID, etc. This message also include the rules for the AMF to keep the ciphering key data such as a timer
2) The AMF stores the keys
3) The UE sends attach or TAU request to the xNB
4) The attach or TAU request is forwarded to AMF FIGS. 4-6 illustrate various systems, devices, and components that may implement aspects of disclosed embodiments.

Figure 4:
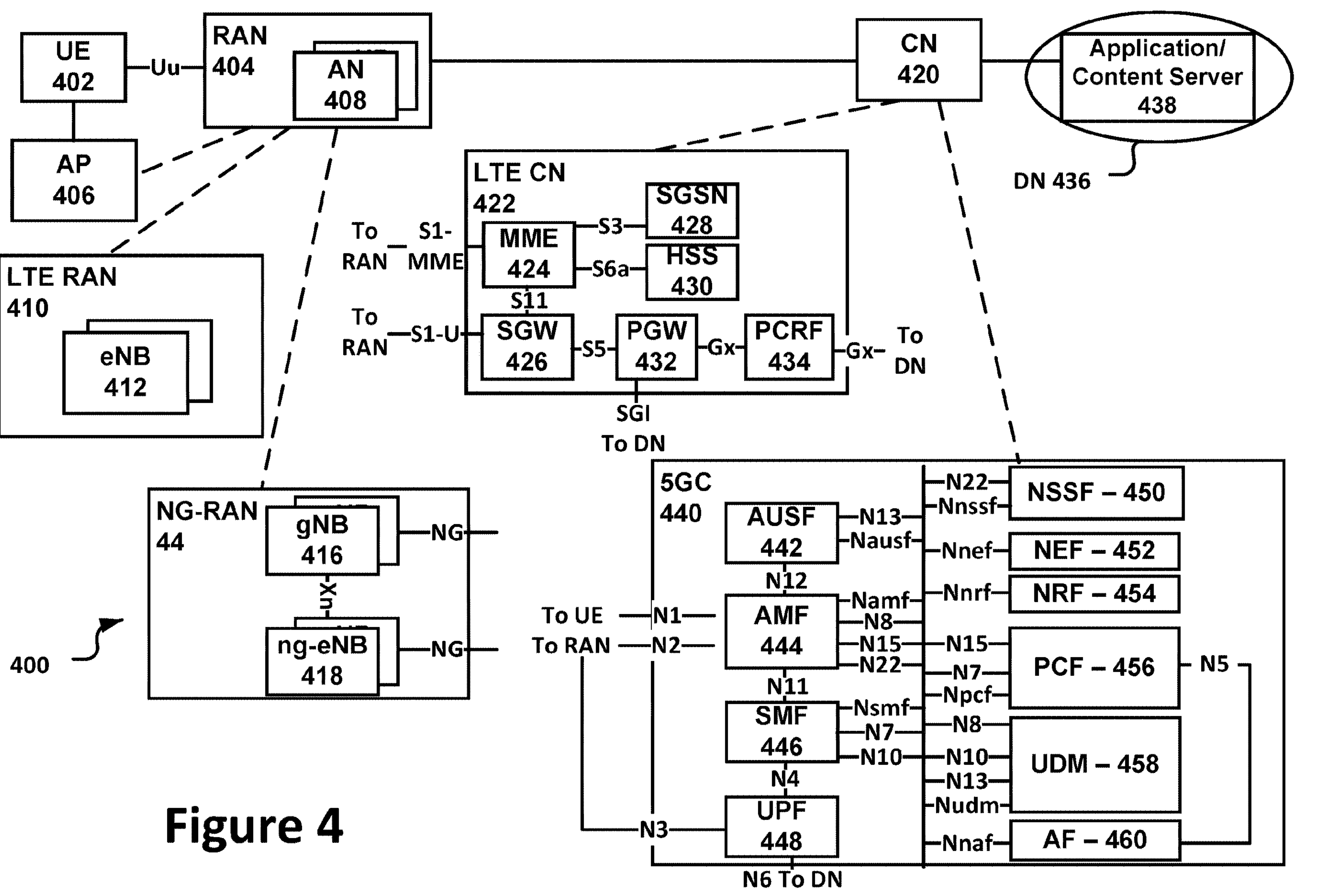
FIG. 4 schematically illustrates a wireless network in accordance with various embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-FiR) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC. PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP. TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 4 36 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NSSAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3$^{rd}$ party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

EXAMPLE PROCEDURES

In some embodiments, the electronic device(s), network (s), system(s), chip(s) or component(s), or portions or implementations thereof, of FIGS. 4-6, or some other figure herein, may be configured to perform one or more processes, techniques, or methods as described herein, or portions thereof.

One such process is depicted in FIG. 7. In this example, process 700 includes, at 705, retrieving, from a memory, system information block (SIB) information from a memory, wherein the SIB information includes information regarding computing offloading between a user equipment (UE) and a cellular network. The process further includes, at 710, encoding a message for transmission to the UE that includes the SIB information.

Figure 8:
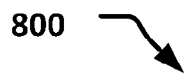

Another such process is depicted in FIG. 8. In this example, process 800 includes, at 805, determining, by a next-generation NodeB (gNB), system information block (SIB) information that includes information regarding computing offloading between a user equipment (UE) and a cellular network. The process further includes, at 810, encoding, by the gNB, a message for transmission to the UE that includes the SIB information.

Figure 9:
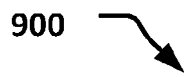

Another such process is depicted in FIG. 9. In this example, process 900 includes, at 905, determining, by a next-generation NodeB (gNB), system information block (SIB) information that includes information regarding computing offloading that is supported between a user equipment (UE) and a cellular network, the information regarding computing offloading including an indication of at least one of: whether computing offloading using computing as a platform micro-service is supported, and whether computing as an infrastructure resource is supported. The process further includes, at 910, encoding, by the gNB, a message for transmission to the UE that includes the SIB information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a new SIB type for computing offloading that can be either broadcast or non-broadcast to UEs. The computing SIB includes the following information as IEs listed in Option1.

Example 2 may include a new service SIB for computing offloading that includes additionally UE specific information as IEs to enable computing related information/assistance data sent to UE via unicast or multi-cast based on cyphering keys. The service SIB includes The generic information for computing offloading defined in 5.1.1

Additional UE or UE group specific information for computing offloading defined in Option2.

Example 3 may include in Option2, the ciphering keys can be generated by Comp CF and delivered via AMF or xNB where:

The ciphering keys are generated and stored in AMF or xNB with a defined rule by Comp CF, which sends the ciphering key data message to AMF or xNB with the related identifiers such as UE IDs, S-NSSAI, DNN, group ID, app ID, etc.

The AMF or xNB stores the ciphering keys which can be UE or UE group specific

The UE can send an existing NAS messages/requests to AMF which decides to send the ciphering key with the NAS messages/responses to the UE The UE can send an RRC messages/requests to xNB which decides decides to send the ciphering key with the RRC messages/responses to the UE The ciphering keys can be deleted based on the retention rules defined by Comp CF when sending the ciphering keys. The ciphering keys can also be updated periodically.

Example 4 includes a method of a next-generation NodeB (gNB) comprising:

determining system information block (SIB) information for computing offloading; and encoding a message for transmission to a user equipment (UE) that includes SIB-Typeinfo with the determined SIB information for computing offloading.

Example 5 includes the method of example 4 or some other example herein, wherein the determined SIB information for computing offloading includes an indication of whether computing offloading between the UE and a cellular network is supported.

Example 6 includes the method of example 4 or some other example herein, wherein the determined SIB information for computing offloading includes an indication of a supported computing offloading mechanism.

Example 7 includes the method of example 4 or some other example herein, wherein the determined SIB information for computing offloading includes an indication of application or vendor information supported to extend cellular network computing capability exposure for an external party.

Example 8 includes the method of example 4 or some other example herein, wherein the determined SIB information for computing offloading includes an indication of Example 9 includes the method of example 4 or some other example herein, wherein the determined SIB information for computing offloading includes an indication of a maximum computing resource that can be requested per UE.

Example 10 includes the method of example 4 or some other example herein, wherein the determined SIB information for computing offloading includes an indication of a computing service that can be provided to the UE as a micro service.

Example 11 includes the method of example 4 or some other example herein, wherein the determined SIB information for computing offloading includes an indication of Example 12 includes the method of example 4 or some other example herein, wherein the determined SIB information for computing offloading includes an indication of a capability or parameter related to an interconnect scheme to a computing resource or service.

Example 13 includes the method of example 4 or some other example herein, wherein the determined SIB information for computing offloading includes an indication of capability requirements associated with the UE.

Example 14 includes the method of example 4 or some other example herein, wherein the determined SIB information for computing offloading includes an indication of: a barring list of UEs for computing offloading, expected performance metrics for computing offloading, a radio configuration for a computing session, information to access a computing control function (Comp CF), or information about dynamic resource utilization of computing services.

Example 15 includes a method of a next-generation NodeB (gNB), comprising:

- determining information associated with requesting a system information block (SIB) for computing offloading; and
- encoding a message for transmission to a user equipment (UE) with a radio resource control (RRC) information element (IE) that includes the determined information.

Example 16 includes the method of example 15 or some other example herein, wherein the RRC IE is an RRCSystemInfoRequest IE and the determined information is included in an rrcCompSystemInfoRequest portion of the RRCSystemInfoRequest IE.

Example 17 includes the method of example 15 or some other example herein, wherein at least a portion of the determined information is UE-specific or non-UE-specific.

Example 18 includes the method of example 17 or some other example herein, wherein the determined information includes UE-specific information comprising an expiration time and segmentation and ciphering keys information.

Example 19 includes the method of example 18 or some other example herein, wherein the UE-specific information further includes computing results, a computing task notification, UE-specific computing handling rules and policies, computing offloading related quality of service (QoS) information, computing resource status information, computing service status information, status information associated with computing offloading transport, or data associated with an interconnect scheme.

Example X1 includes an apparatus comprising:

- memory to store system information block (SIB) information; and
- processing circuitry, coupled with the memory, to:
  - retrieve the SIB information from the memory, wherein the SIB information includes information regarding computing offloading between a user equipment (UE) and a cellular network; and
  - encode a message for transmission to the UE that includes the SIB information.

Example X2 includes the apparatus of example X1 or some other example herein, wherein the information regarding computing offloading includes an indication of whether computing offloading between the UE and the cellular network is supported.

Example X3 includes the apparatus of example X1 or some other example herein, wherein the information regarding computing offloading includes an indication of at least one of whether computing offloading using computing as a platform micro-service is supported, and whether computing as an infrastructure resource is supported.

Example X4 includes the apparatus of example X1 or some other example herein, wherein the information regarding computing offloading includes an indication of application or vendor information supported to extend cellular network computing capability exposure for an external party.

Example X5 includes the apparatus of example X1 or some other example herein, wherein the information regarding computing offloading includes an indication of a maximum amount of a computing resource that can be requested per UE, and wherein the computing resource includes an indication of: a resource type, a resource size, or a programming language.

Example X6 includes the apparatus of example X1 or some other example herein, wherein the information regarding computing offloading includes an indication of a computing service that can be provided to the UE, wherein the computing service includes: an AI/ML service, a video or image processing service, or a data analytics service.

Example X7 includes the apparatus of example X1 or some other example herein, wherein the information regarding computing offloading includes an indication of a capability or parameter related to an interconnect to a computing resource or service.

Example X8 includes the apparatus of example X1 or some other example herein, wherein the information regarding computing offloading includes: a UE capability requirement, a list of UEs barred from computing offloading, an expected performance metric for computing offloading, a radio configuration for a computing session, information to access a computing control function (Comp CF), or information about dynamic resource utilization of computing services.

Example X9 includes the apparatus of any of examples X1-X8 or some other example herein, wherein the apparatus includes a next-generation NodeB (gNB) or portion thereof.

Example X10 includes the apparatus of any of examples X1-X8 or some other example herein, wherein the message including the SIB information is encoded for transmission to the UE in response to a request for the SIB information from the UE.

Example X11 includes one or more computer-readable media storing instructions that, when executed by one or more processors, cause a next-generation NodeB (gNB) to:

- determine system information block (SIB) information that includes information regarding computing offloading between a user equipment (UE) and a cellular network; and
- encode a message for transmission to the UE that includes the SIB information.

Example X12 includes the one or more computer-readable media of example X11 or some other example herein, wherein the information regarding computing offloading includes an indication of whether computing offloading between the UE and the cellular network is supported.

Example X13 includes the one or more computer-readable media of example X11 or some other example herein, wherein the information regarding computing offloading includes an indication of at least one of: whether computing offloading using computing as a platform micro-service is supported, and whether computing as an infrastructure resource is supported.

Example X14 includes the one or more computer-readable media of example X11 or some other example herein, wherein the information regarding computing offloading includes an indication of application or vendor information supported to extend cellular network computing capability exposure for an external party.

Example X15 includes the one or more computer-readable media of example X11 or some other example herein, wherein the information regarding computing offloading includes an indication of a maximum amount of a computing resource that can be requested per UE, and wherein the computing resource includes an indication of: a resource type, a resource size, or a programming language.

Example X16 includes the one or more computer-readable media of example X11 or some other example herein, wherein the information regarding computing offloading includes an indication of a computing service that can be provided to the UE, wherein the computing service includes: an AI/ML service, a video or image processing service, or a data analytics service.

Example X17 includes the one or more computer-readable media of example X11 or some other example herein, wherein the information regarding computing offloading includes an indication of a capability or parameter related to an interconnect to a computing resource or service.

Example X18 includes the one or more computer-readable media of example X11 or some other example herein, wherein the information regarding computing offloading includes: a UE capability requirement, a list of UEs barred from computing offloading, an expected performance metric for computing offloading, a radio configuration for a computing session, information to access a computing control function (Comp CF), or information about dynamic resource utilization of computing services.

Example X19 includes the one or more computer-readable media of any of examples X11-X18 or some other example herein, wherein the message including the SIB information is encoded for transmission to the UE in response to a request for the SIB information from the UE.

Example X20 includes one or more computer-readable media storing instructions that, when executed by one or more processors, cause a next-generation NodeB (gNB) to:

determine system information block (SIB) information that includes information regarding computing offloading that is supported between a user equipment (UE) and a cellular network, the information regarding computing offloading including an indication of at least one of: whether computing offloading using computing as a platform micro-service is supported, and whether computing as an infrastructure resource is supported; and encode a message for transmission to the UE that includes the SIB information.

Example X21 includes the one or more computer-readable media of example X20 or some other example herein, wherein the information regarding computing offloading includes an indication of application or vendor information supported to extend cellular network computing capability exposure for an external party.

Example X22 includes the one or more computer-readable media of example X20 or some other example herein, wherein the information regarding computing offloading includes an indication of a maximum amount of a computing resource that can be requested per UE, and wherein the computing resource includes an indication of: a resource type, a resource size, or a programming language.

Example X23 includes the one or more computer-readable media of example X20 or some other example herein, wherein the information regarding computing offloading includes at least one of:

an indication of a computing service that can be provided to the UE, wherein the computing service includes: an AI/ML service, a video or image processing service, or a data analytics service;

an indication of a capability or parameter related to an interconnect to a computing resource or service; and a UE capability requirement, a list of UEs barred from computing offloading, an expected performance metric for computing offloading, a radio configuration for a computing session, information to access a computing control function (Comp CF), or information about dynamic resource utilization of computing services.

Example X24 includes the one or more computer-readable media of any of examples X20-X24 or some other example herein, wherein the message including the SIB information is encoded for transmission to the UE in response to a request for the SIB information from the UE.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |

-continued

| | |
|---|---|
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |

-continued

| | |
|---|---|
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |

-continued

| | |
|---|---|
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec |

-continued

| | |
|---|---|
| | Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |

-continued

| | |
|---|---|
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |

-continued

| | |
|---|---|
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |

-continued

| | |
|---|---|
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |

-continued

| | |
|---|---|
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a next generation Node B (gNB), the apparatus comprising:

memory to store system information block (SIB) information; and processing circuitry, coupled with the memory, to:

retrieve the SIB information from the memory, wherein the SIB information includes information regarding computing offloading between a user equipment (UE) and a cellular network including a computing task notification that differentiates between a first task type to be deleted automatically after successful completion and a second task type to continue running until a deletion request is received; and encode a message for transmission to the UE that includes the SIB information.

2. The apparatus of claim 1, wherein the information regarding computing offloading includes: an indication of whether computing offloading between the UE and the cellular network is supported, and indication of whether computing offloading using computing as a platform microservice is supported, or an indication of whether computing as an infrastructure resource is supported.

3. The apparatus of claim 1, wherein the information regarding computing offloading includes an indication of application or vendor information supported to extend cellular network computing capability exposure for an external party.

4. The apparatus of claim 1, wherein the information regarding computing offloading includes an indication of a maximum amount of a computing resource that can be requested per UE, and wherein the computing resource includes an indication of: a resource type, a resource size, or a programming language.

5. The apparatus of claim 1, wherein the information regarding computing offloading includes an indication of a computing service that can be provided to the UE, wherein the computing service includes: an artificial intelligence (AI)/machine learning (ML) service, a video or image processing service, or a data analytics service.

6. The apparatus of claim 1, wherein the information regarding computing offloading includes an indication of a capability or parameter related to an interconnect to a computing resource or service.

7. The apparatus of claim 1, wherein the information regarding computing offloading includes: a UE capability requirement, a list of UEs barred from computing offloading, an expected performance metric for computing offloading, a radio configuration for a computing session, information to access a computing control function (Comp CF), or information about dynamic resource utilization of computing services.

8. The apparatus of claim 1, wherein the message including the SIB information is encoded for transmission to the UE in response to a request for the SIB information from the UE.

9. One or more non-transitory computer-readable media storing instructions that, when executed by one or more processors, cause a next-generation NodeB (gNB) to:

determine system information block (SIB) information that includes information regarding computing offloading between a user equipment (UE) and a cellular network including a computing task notification that differentiates between a first task type to be deleted automatically after successful completion and a second task type to continue running until a deletion request is received; and encode a message for transmission to the UE that includes the SIB information.

10. The one or more non-transitory computer-readable media of claim 9, wherein the information regarding computing offloading includes: an indication of whether computing offloading between the UE and the cellular network is supported, an indication of whether computing offloading using computing as a platform micro-service is supported, or an indication of whether computing as an infrastructure resource is supported.

11. The one or more non-transitory computer-readable media of claim 9, wherein the information regarding computing offloading includes an indication of application or vendor information supported to extend cellular network computing capability exposure for an external party.

12. The one or more non-transitory computer-readable media of claim 9, wherein the information regarding computing offloading includes an indication of a maximum amount of a computing resource that can be requested per UE, and wherein the computing resource includes an indication of: a resource type, a resource size, or a programming language.

13. The one or more non-transitory computer-readable media of claim 9, wherein the information regarding computing offloading includes an indication of a computing service that can be provided to the UE, wherein the computing service includes: an artificial intelligence (AI)/machine learning (ML) service, a video or image processing service, or a data analytics service.

14. The one or more non-transitory computer-readable media of claim 9, wherein the information regarding computing offloading includes an indication of a capability or parameter related to an interconnect to a computing resource or service.

15. The one or more non-transitory computer-readable media of claim 9, wherein the information regarding computing offloading includes: a UE capability requirement, a list of UEs barred from computing offloading, an expected performance metric for computing offloading, a radio configuration for a computing session, information to access a computing control function (Comp CF), or information about dynamic resource utilization of computing services.

16. The one or more non-transitory computer-readable media of claim 9, wherein the message including the SIB information is encoded for transmission to the UE in response to a request for the SIB information from the UE.

17. One or more non-transitory computer-readable media storing instructions that, when executed by one or more processors, cause a user equipment (UE) to:

determine system information block (SIB) information that includes information regarding computing offloading that is supported between the UE and a cellular network, the information regarding computing offloading including a computing task notification that differentiates between a first task type to be deleted automatically after successful completion and a second task type to continue running until a deletion request is received; and process a message received by the UE that includes the SIB information.

18. The one or more non-transitory computer-readable media of claim 17, wherein the information regarding computing offloading includes an indication of application or vendor information supported to extend cellular network computing capability exposure for an external party.

19. The one or more non-transitory computer-readable media of claim 17, wherein the information regarding computing offloading includes an indication of a maximum amount of a computing resource that can be requested per UE, and wherein the computing resource includes an indication of: a resource type, a resource size, or a programming language.

20. The one or more non-transitory computer-readable media of claim 17, wherein the information regarding computing offloading includes at least one of:

an indication of a computing service that can be provided to the UE, wherein the computing service includes: an artificial intelligence (AI)/machine learning (ML) service, a video or image processing service, or a data analytics service;

an indication of a capability or parameter related to an interconnect to a computing resource or service; and a UE capability requirement, a list of UEs barred from computing offloading, an expected performance metric for computing offloading, a radio configuration for a computing session, information to access a computing control function (Comp CF), or information about dynamic resource utilization of computing services.

* * * * *